April 9, 1935.  W. A. HARMS  1,997,518
SIGNALING APPARATUS
Filed Dec. 19, 1933
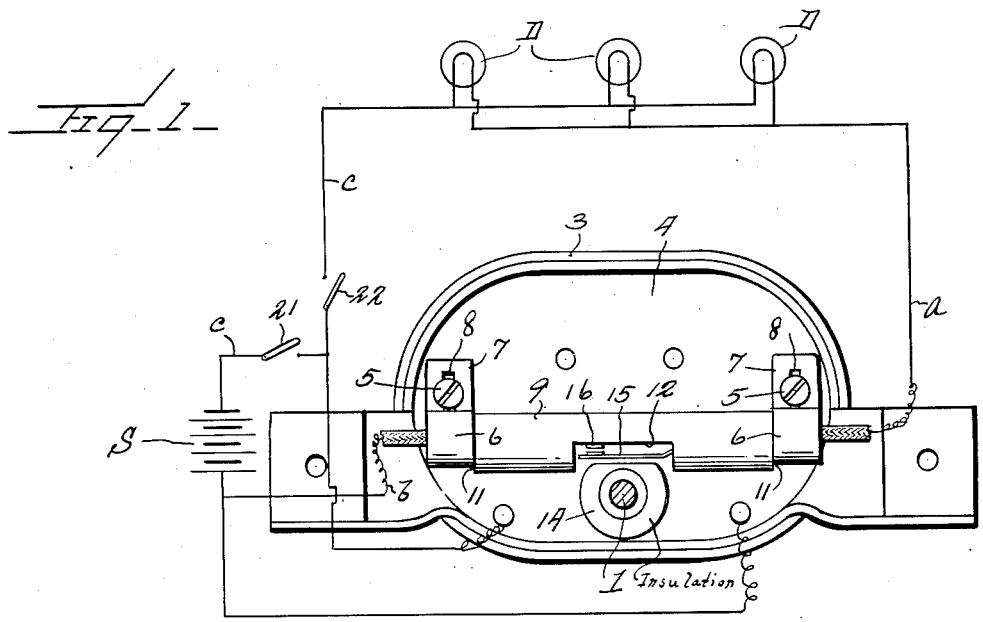
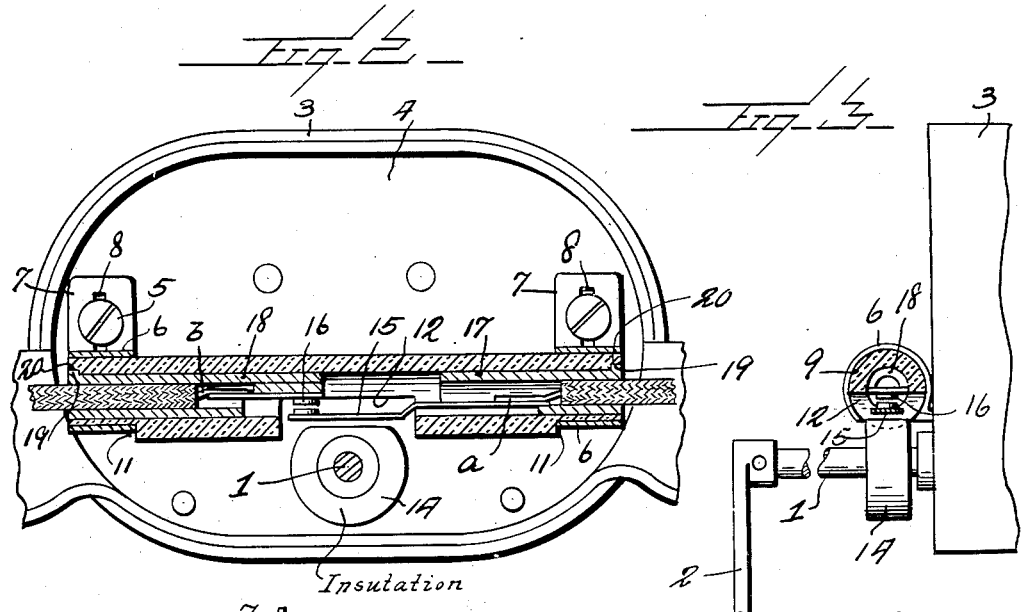
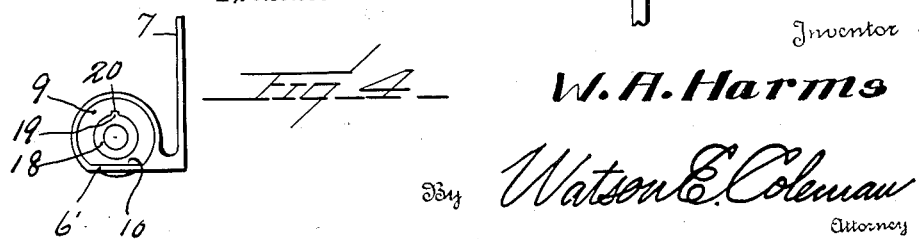

Patented Apr. 9, 1935

1,997,518

UNITED STATES PATENT OFFICE 1,997,518

SIGNALING APPARATUS

William A. Harms, Davenport, Nebr.

Application December 19, 1933, Serial No. 703,116

1 Claim. (Cl. 200—30)

This invention relates to a signaling apparatus, and it is an object of the invention to provide an apparatus of this kind having associated therewith means whereby said apparatus will be caused to operate intermittently and thus materially increase its efficiency.

It is also an object of the invention to provide a signaling apparatus particularly designed for use in connection with an automobile and intended to be active when the automobile is at a standstill to give warning to an approaching vehicle and thus giving due notice of a hazard in the roadway.

Another object of the invention is to provide a signaling apparatus of this kind of an intermittent or flash type and which is particularly intended for use when a vehicle is at a standstill occasioned by an emergency, such as changing a tire, making repairs or for other reasons which would cause the vehicle to be a hazard to traffic.

An additional object of the invention is to provide a flash or intermittent signal for an automobile wherein the operation of the signal is under control of the oscillating shaft of a windshield wiper.

The invention consists in the details of construction and in the combination and arrangement of the several parts of my improved signaling apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in elevation and of a diagrammatic character illustrating an apparatus constructed in accordance with an embodiment of my invention, certain of the parts being in section;

Figure 2 is an enlarged view partly in section and partly in elevation of the circuit making and breaking means as herein employed;

Figure 3 is a view partly in side elevation and partly in section of the apparatus as herein embodied;

Figure 4 is a fragmentary detailed elevational view illustrating one of the mountings as herein employed.

As disclosed in the accompanying drawing, 1 denotes a shaft carrying a windshield wiper arm 2 and which shaft 1 is adapted to be oscillated in a well known manner by a suitable motor arranged within the casing 3. These parts in themselves form no part of the present invention as they are now well known and in use and relate to a structure which is adapted to be mounted in proper position with respect to a windshield operator to assure clear vision for the driver of a car during inclement weather.

The end or head plate 4 of the casing 3 adjacent to the arm 2 has held thereto by the screws 5 or the like a pair of brackets 6. A bracket 6 is at one side of the shaft 1 and the second bracket at the opposite side with the shaft 1 substantially midway of the brackets.

Each of the brackets, as herein disclosed, comprises an encircling member having a straight portion 6' and which encircling member is carried by and extends forwardly from the lower end portion of an arm 7. This arm 7 is provided with a longitudinally disposed slot 8 through which a holding screw 5 or the like passes whereby the bracket 6 may be readily and conveniently adjusted as the requirements of practice may necessitate. The brackets 6 are aligned in a plane above the shaft 1 and said brackets snugly receive the extremities of an elongated tubular member 9 of fibre or other desired insulating material, each of said extremities having a portion flattened, as at 10, for proper coaction with the straight portion 6' of a bracket so that the tubular member 9 will be held against rotation. Each of the reduced portions 10 of the tubular member 9 produces a shoulder 11 spaced inwardly from the adjacent end of the member 9 a distance preferably equal to the width of the encircling member of a bracket 6. Each of these shoulders 11 coacts with a bracket to effectively hold the applied member 9 against endwise movement.

The central portion of the member 9 is cut out to provide an elongated opening 12 opposed to the shaft 1 when the member 9 is applied so that a rocker member 14 oscillating with the shaft 1 will have desired engagement with a spring contact member 15 to intermittently bring said spring contact into engagement with a stationary contact 16.

The spring contact 15 comprises an elongated arm possessing the required degree of inherent resiliency and having an end portion disposed inwardly of a sleeve 17 of copper as is also the spring contact 15. This inner end portion of the arm as particularly illustrated in Figure 3 is soldered, welded or otherwise secured to the side edges of a cut-out portion of the sleeve 17 at the inserted extremity thereof. This connected portion of the spring contact arm 15 also has electrically connected therewith a conductor $a$ inserted within the sleeve 17 through the outer end thereof.

The stationary contact 16 comprises an elongated arm which is rigidly held or mounted within the inserted end portion of a second sleeve 18, the same being also preferably of copper as well as the stationary contact arm 16. This stationary contact arm has connected therewith a conductor $b$ insertable within the sleeve 18 through the outer end thereof.

The outer end portion of each of the sleeves carries an outstanding lip or lug 19 which is received within a pocket or recess 20 produced in the wall of the bore of the tubular member 9 at the outer end thereof so that when a sleeve 17 or 18 is applied the same will be effectively held against rotation and thus assure maintenance in desired position of the contacts 15 or 16.

The conductor $b$ is in electrical connection with a suitable source S of electrical energy and also leading from the source S is a conductor $c$ and interposed in parallel with the conductors $a$ and $c$ are the signal devices D herein disclosed as electric lamps. It is, therefore, believed to be apparent that with the operating circuit for the devices D normally closed, with the exception of course of the contact members 15 and 16, that as the shaft 1 is oscillated the member 14 will bring the contact 15 intermittently into engagement with the contact 16 and thus effect an intermittent flashing of the signal devices D.

These signal devices D are adapted to be positioned upon a car at a location whereby in operation they will be readily observed by approaching cars and it is to be stated that the signal devices D are primarily intended to function when the vehicle is at a standstill in the roadway and particularly in emergency, such as repairing a tire or otherwise working upon the car.

The advantages of my signaling apparatus are believed to be apparent as it will serve to materially eliminate traffic accidents due to a standing car not being seen by approaching traffic with resultant collision.

As illustrated in Figure 1, it is to be noted that the operating circuit for the signal devices D is also associated with the circuit for the motor operating the wiper arm 2. The conductor $c'$ therefor has interposed therein two switches 21 and 22. The switch 21 is a main switch and when open breaks the circuit for both the signal devices D and the operating motor for the arm 2. When the switch 21 alone is closed the shaft 1 only will be operated but with the switch 21 closed, the closing of the switch 22 will result in the desired flashing of the signal devices D as the shaft 1 is in motion.

From the foregoing description it is thought to be obvious that a signaling apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A circuit closer comprising a tubular member of insulating material open at its ends and having an opening in its wall intermediate its ends, sleeves insertable within the tubular member through the outer open ends thereof, each of said sleeves being adapted for electrical connection within a circuit, the inserted end of one of the sleeves carrying a stationary contact, a movable contact carried by the inserted end portion of the second sleeve and overlying the first named contact, and means working through the opening in the wall of the tubular member for intermittently engaging the movable contact to move the same into engagement with the stationary contact, each of said sleeves and the tubular member having coacting means for holding the sleeves against rotation within the tubular member.

WILLIAM A. HARMS.